(12) United States Patent
Bertin

(10) Patent No.: US 8,473,599 B2
(45) Date of Patent: Jun. 25, 2013

(54) COMMUNICATION NETWORK LIST MANAGEMENT SENDING UPDATED MEMBER DATA FROM A PROVISIONING SYSTEM TO A LIST MANAGER AND THEN TO AN APPLICATION SERVER

(75) Inventor: Olivier Bertin, Alpes-Maritimes (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 70 days.

(21) Appl. No.: 13/172,354

(22) Filed: Jun. 29, 2011

(65) Prior Publication Data

US 2012/0005266 A1    Jan. 5, 2012

Related U.S. Application Data

(60) Provisional application No. 61/360,680, filed on Jul. 1, 2010.

(51) Int. Cl.
*G06F 15/173* (2006.01)

(52) U.S. Cl.
USPC .......................................... 709/223

(58) Field of Classification Search
USPC ........................................... 709/223
See application file for complete search history.

(56) References Cited

U.S. PATENT DOCUMENTS

| | | | |
|---|---|---|---|
| 7,269,162 B1 * | 9/2007 | Turner | 370/352 |
| 7,634,558 B1 * | 12/2009 | Mangal et al. | 709/224 |
| 7,969,993 B2 * | 6/2011 | Shimamura et al. | 370/401 |
| 8,140,692 B2 * | 3/2012 | Houri et al. | 709/229 |
| 2006/0286993 A1 * | 12/2006 | Xie et al. | 455/518 |
| 2007/0198589 A1 * | 8/2007 | Houri et al. | 707/104.1 |
| 2008/0182591 A1 * | 7/2008 | Krikorian | 455/456.3 |
| 2011/0107436 A1 * | 5/2011 | Cholas et al. | 726/29 |
| 2011/0283172 A1 * | 11/2011 | Berger et al. | 715/202 |
| 2012/0028614 A1 * | 2/2012 | Bertin et al. | 455/412.2 |

* cited by examiner

*Primary Examiner* — Lance L Barry
(74) *Attorney, Agent, or Firm* — Adam P. Franks

(57) ABSTRACT

A list of users of a communication network is managed. For example, a list manager may manage a list identifying a set of list members, and an application server may obtain the set of members of the list. The application server may obtain status data relating to the obtained set of members and determine a set of users subscribed to the list. The application server may send updates in the obtained status data to the determined list of users.

12 Claims, 2 Drawing Sheets

COMMUNICATION NETWORK LIST MANAGEMENT SENDING UPDATED MEMBER DATA FROM A PROVISIONING SYSTEM TO A LIST MANAGER AND THEN TO AN APPLICATION SERVER

CLAIM TO PRIORITY

The present application claims priority to U.S. Provisional Patent Application Ser. No. 61/360,680, entitled Systems and Methods for Managing Lists, filed Jul. 1, 2010, which is incorporated by reference in its entirety.

BACKGROUND OF THE DISCLOSURE

In communication systems it is common for users to subscribe to services that show status information of other users. For example, in many so-called instant messaging (IM) applications one user may add another user to their personal contact list, and receive status updates from an instant messaging server relating to the users in their personal contact list. In this way, one user may see when other users in their contact list are connected to the network, are busy, are available, and so on.

Currently, however, each user has to manage their own individual contacts list, and has to individually subscribe to receive status updates of users in their contact lists.

BRIEF DESCRIPTION

Figure 1:
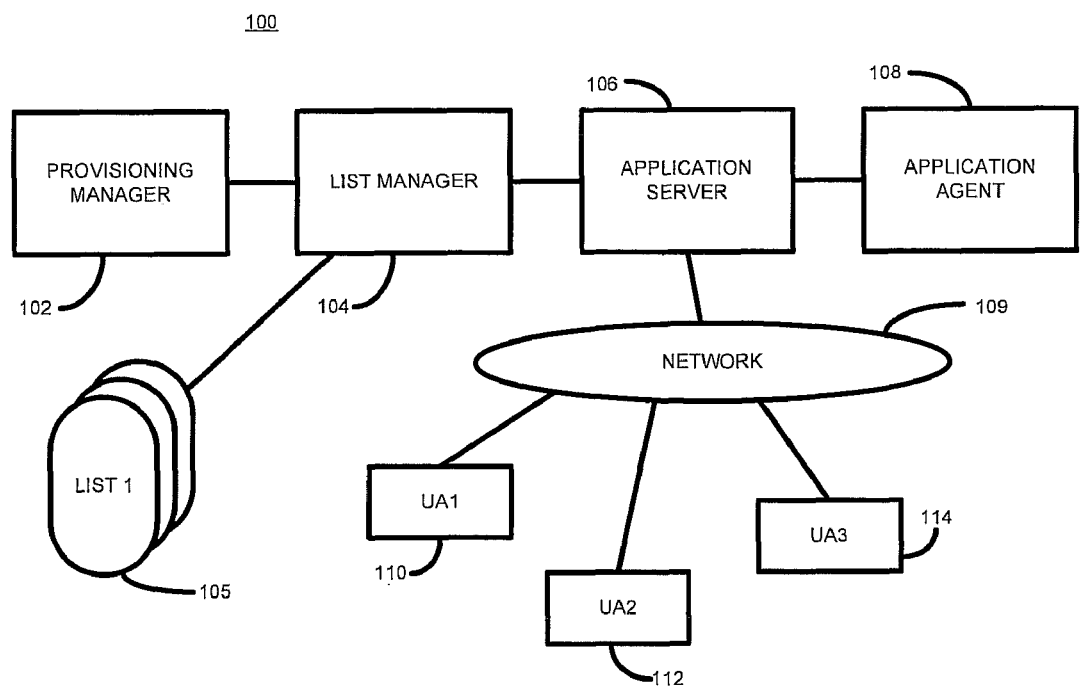
Figure 2:
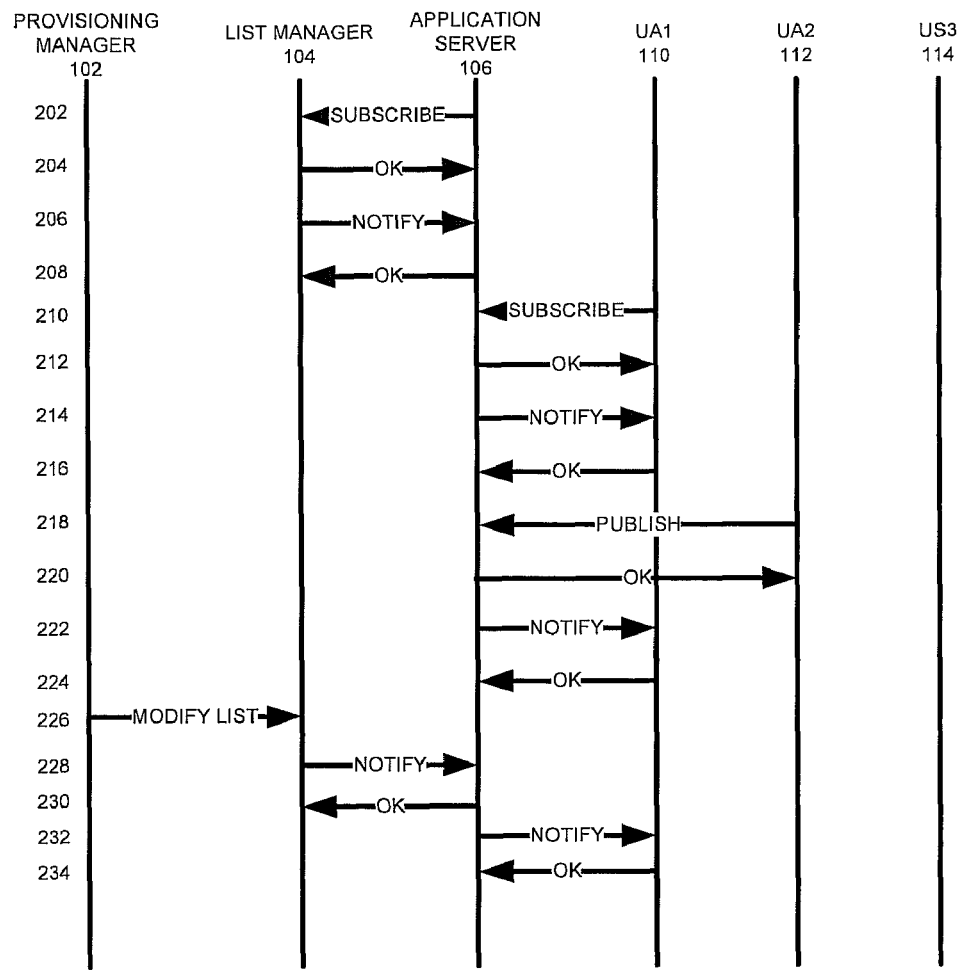

Embodiments and examples of the invention will now be described, by way of non-limiting example only, with reference to the accompanying drawings, in which:

FIG. 1 is a simplified block diagram showing a system according to one example; and FIG. 2 is a simplified message flow diagram outline example messages sent between different ones of the elements of the system of FIG. 1.

DETAILED DESCRIPTION

Referring now to FIG. 1 there is shown a simplified block diagram of a list management system 100 according to one example. Further reference is made to the flow diagram of FIG. 2.

The system 100 comprises a number of user agents (UA) 110, 112, and 114. The user agents may be, for example, software applications executing on a computing device such as a personal computer, a mobile computer, a mobile telephone, a smartphone, or the like. The user agents may be, for example, an instant messaging client, or the like.

Each UA 110, 112, and 114 connects to an application server 106 across a network 109. The network 109 may be any kind of suitable network including, for example, the Internet, a mobile telephone network, a third or fourth generation network, a next generation network, an Internet protocol (IP) network, or the like. In one example the application server 106 may be a presence server, such as a session initiation protocol (SIP) presence server.

An application server 106 manages the notifications sent to and received from the UAs 110, 112, and 114.

Initially the application server 106 subscribes to one or more lists 105 managed by a list manager 104 by sending a subscribe message (202) to the list manager 104. Each list 105 subscribed to by the application server 106 may be identified, for example, by a list name, a list identification number, or in any other suitable manner. Each list comprises details of members of the list. Each member of the list may be identified in an appropriate manner including, for example, a telephone number, a session initiation protocol (SIP) address, an email address, a user ID. A list may be personal to a single UA, or may be shared between many UAs or other users.

The list manager 104 sends an acknowledgement message (204) to the application server 106 and then sends one or more notification messages containing the details of the members of the identified list. The application server 106 sends an acknowledgement message (208) confirming receipt of the received notifications.

When the application server 106 has received the list details, it obtains, where available, status data relating to each of the members on the list. For example, if a member has recently or previously published status data to the application server 106, the application server 106 may use that status data as the status of that member.

The status data may include, for example, status data related to a member's presence, such as "available", "offline", "busy", "away", "driving", "in a call", etc. Other kinds of status may include, for example, call status, network registration status, waiting message indication status, to name but a few.

When the UA1 110 wishes to connect to the system, it sends a subscribe message (210) to the application server 106 identifying the list or lists managed by the list manager 104 that the UA1 110 wants to subscribe to. The application server 106 sends an acknowledge message (212) back the UA 110, and then sends a notify message (214) comprising the details and status of each of the members of each list subscribed to. The UA1 110 sends an acknowledgment message (216) back to the application server 106.

If one of the UAs, such as UA2 112, modifies their status, for example, by selecting to change their contact list status from "available" to "busy", it sends a publish message (218) to the application server 106 with their current or updated status. The application server 106 sends an acknowledgement message (220) back to the UA2 112.

The application server 106 updates the status data of the UA2 in the appropriate contact list or lists, and sends a notify message (222) to the UA1 110 subscribed to the changed contact list. The UA1 may then update, for example, a display element indicating the change. The UA1 then sends an acknowledgement message (224) back to the application server 106.

Although not shown in FIG. 2, and other UAs also subscribed to the same contact list will also be sent separate notify messages from the application server 106 when a change in status of a member of a subscribed-to contact list is made.

The system 100 additional comprises a provisioning manager 102 used for provisioning data to the contact lists 105 managed by the list manager 104. In the present example the provisioning manager 102 may be accessible through a web interface. In other examples, the provisioning manager 102 may be accessible through a voice interface, an SMS interface, a WAP interface, and the like.

In the present example the provisioning manager 102 may be linked to or accessible through one or more social networking web sites or other systems or applications used by members of a list managed by the list manager 104 to update their status information. For example, a widget, applet, or other application may be provided on a social networking web site to enable direct interaction with the provisioning manager 102. In this way, a user of a social networking web site may be provided with an easy and quick mechanism through which contact lists may be managed. For example, a user of a social networking web site may create or manage a contact list for their on-line friends or contacts. Changes to their on-line friends or contacts may be reflected in the corresponding contact list managed by the list manager 104.

For example, the provisioning manager may provide a suitable interface through which members of a list may be displayed and modified. For example, members of a list may be deleted from the list, may be added to the list, or their details may be changed in the list.

Any changes made through the provisioning manager 102 are notified to the list manager 104 through a list modification message 226. The list modification message (226) may include, for example, details identifying a contact list and details of the changes to be made to that contact list, such as details of members to be added to or deleted from the list.

The list manager 104 sends a notification message (228) to the application server 106 detailing the changes to the list membership. The application server 106 sends an acknowledge message (230) back to the list manager 104. If the application server 104 determines that a new member has been added to the list the application server 104 tries to determine the current status of that member. For instance, if the newly added list member has recently published their status to the application server 104 the application server 104 may use that recently published status. The application server 104 then sends a notify message, such as notify message 232, to each of the UAs subscribed to the concerned list. An acknowledgement message, such as the message 234, is sent by the each of the concerned UAs back to the application server 106.

If, the application server 104 determines that a member of a list has been deleted, a notify message, such as notify message 232, indicating the nature of the change is sent to each of the UAs subscribed to the concerned list.

One of the advantages of examples of the system 100 is that application server 106 performs a centralized function that manages the members of a list and obtains and publishes changes in status to subscribers to the list. Such an approach advantageously may lead to a significant reduction in the number of messages being sent across the communications networks. This is particularly important in mobile communication networks where bandwidth may be limited or network subscriptions costly.

A further advantage is provided by the way that the list manager 104 is decoupled from the application or presence server 106. This enables the list manager just to manage the members in a list, and enables the application server 106 to manage the status data of the members in a list.

In contrast, in prior systems each UA would subscribe individually to status updates for each member of their contact list. This would cause each UA to send a subscribe message for each member of their contact list, and to receive a corresponding acknowledgement message for each subscribe message. Furthermore, the application server would then have to send individual notification messages reporting the status of each of members of the UA's contact list, and to receive corresponding acknowledge messages for each notify message sent.

In the examples described above, however, each UA only has to subscribe once to a list, and thus only has to send one subscribe message per list and receive one corresponding notify message. As previously mentioned, in mobile communication networks economic use of bandwidth is particularly important, especially as the number of mobile communication network subscribers continues to increase.

It will be appreciated that embodiments and examples described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage, which may be non-transitory, that are suitable for storing a program or programs that, when executed, implement the methods and functions of the embodiments and examples described above. Accordingly, embodiments provide a program comprising code for implementing a system or method as claimed in any preceding claim and a machine readable storage storing such a program. Still further, embodiments may be conveyed electronically via any medium such as a communication signal carried over a wired or wireless connection and embodiments suitably encompass the same. Also, provisioning manager 102, list manager 104, application server 106 and application agent 108 may comprise software executed by a processor. Also, one or more of these components may be a server, such as a computer system, including one or more processors, data storage and network interfaces, connected to a network to provide services to other devices connected to the network. The processors on the servers are operable to execute software to provide the services, such as list and contact management.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method of managing a list of users of a communication network, the method comprising:
    managing, by a list manager, a list of members;
    obtaining, by an application server, the list of members from the list manager;
    obtaining, by the application server, status data relating to the members on the list;
    sending, by the application server, the obtained status data to the members on the list;
    receiving, at a provisioning system, details of changes to be made to the list of members;
    sending the details of the changes to the list of members from the provisioning system to the application server through the list manager;
    updating the list of members by the application server based on the received details of the changes; and
    sending the updated list of members from the application server to each of the members on the list.

2. The method of claim 1, further comprising:
    receiving, at the list manager, the details of the changes from the provisioning system; and
    receiving, at the application server, the details of the changes from the list manager.

3. The method of claim 1, wherein receiving, at a provisioning system, the status data related to the details of changes comprises receiving from an external web site or an external application, at the provisioning system, the status data related to details of the changes.

4. The method of claim 1, wherein obtaining status data comprises receiving, from a member of the list, a change in status of the member, at the application server.

5. The method of claim 1, wherein the status data comprises available, offline, busy, away, driving, or in a call.

6. The method of claim 1, wherein the status data comprises call status, network registration status, or a waiting message indication status.

7. A system for managing lists in a communication network, comprising:
   a list manager to manage a list of members;
   an application server, including a processor, to:
      obtain, from the list manager, the list of members;
      obtain status data relating to at least some of the members on the list; and
      send the obtained status data of the at least some members to each of the members on the list; and
   a provisioning system to receive details of changes to be made to the list of members,
   wherein the details of the changes to be made to the list of members is sent from the provisioning system to the application server through the list manager, and
   wherein the application server is to update the list of members based on the received details of the changes, and send the updated list of members to each of the members on the list.

8. The system of claim 7, wherein the application server obtains the status data relating to at least some of the members on the list from the provisioning manager receiving the status data from an external web site.

9. The system of claim 8, wherein the external web site comprises a social media web site.

10. An application server comprising:
    a processor, to:
    obtain, from a list manager, a list of members;
    obtain status data relating to at least some of the members on the list; and
    send the obtained status data of the at least some members to each of the members on the list,
    wherein a provisioning system is to receive details of changes to be made to the list of members, and the details of the changes to be made to the list of members is sent from the provisioning system to the application server through the list manager; and
    the processor is to receive the details of the changes from the list manager, update the list of members based on the received details of the changes, and send the updated list of members to each of the members on the list.

11. The application server of claim 10, wherein the provisioning system is to receive the details of the changes to be made to the list from an external web site.

12. The application server of claim 10, wherein the status data comprises call status, network registration status, or a waiting message indication status.

\* \* \* \* \*